(12) United States Patent
Marcolino Quintao Severgnini et al.

(10) Patent No.: US 11,486,173 B2
(45) Date of Patent: Nov. 1, 2022

(54) FLUIDIC ELASTOMER ACTUATOR-BASED MECHANICAL CONTROL SYSTEMS FOR VEHICLE DOOR HANDLES

(71) Applicant: TOYOTA MOTOR ENGINEERING & MANUFACTURING NORTH AMERICA, INC., Plano, TX (US)

(72) Inventors: Frederico Marcolino Quintao Severgnini, Ann Arbor, MI (US); Ercan Mehmet Dede, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 387 days.

(21) Appl. No.: 16/578,898

(22) Filed: Sep. 23, 2019

(65) Prior Publication Data

US 2021/0087861 A1     Mar. 25, 2021

(51) Int. Cl.
*E05B 85/10*     (2014.01)
*B60R 25/24*     (2013.01)
(Continued)

(52) U.S. Cl.
CPC ............ *E05B 85/107* (2013.01); *B60R 25/24* (2013.01); *E05B 81/76* (2013.01); *E05B 85/103* (2013.01);
(Continued)

(58) Field of Classification Search
CPC ...... E05B 85/107; E05B 81/76; E05B 85/103; E05B 81/10; E05B 81/64; B60R 25/24; B25J 19/00
See application file for complete search history.

(56) References Cited

U.S. PATENT DOCUMENTS

| 2,348,065 A * | 5/1944 | George | ................. E05B 5/00 |
| | | | 292/DIG. 31 |
| 6,431,643 B2 * | 8/2002 | Grey | ................. B60N 2/002 |
| | | | 105/354 |

(Continued)

FOREIGN PATENT DOCUMENTS

| DE | 102009025943 B3 * | 4/2010 | ............ E05B 5/003 |
| EP | 2032782 | 3/2009 | |

(Continued)

OTHER PUBLICATIONS

"Enclose." Merriam-Webster.com Dictionary, Merriam-Webster, https://www.merriam-webster.com/dictionary/enclose. Accessed Nov. 18, 2021. (Year: 2021).*

(Continued)

*Primary Examiner* — Kristina R Fulton
*Assistant Examiner* — Emily G. Brown
(74) *Attorney, Agent, or Firm* — Sheppard, Mullin, Richter & Hampton LLP; Hector A. Agdeppa; Daniel N. Yannuzzi

(57) ABSTRACT

Systems and methods for a fluidic elastomer actuator-based handle is provided. A processor determines when a person is approaching a vehicle door and, in response to determining a person is approaching the vehicle door, the processor determines if the door handle is necessary based on a determined intent of the person. If the intent is determined to open the door, the processor manipulates a soft robotics material enclosing the door handle into an in-use state to present the handle to the person through the application of one or more stimuli. When not in a rest state, the soft robotics material provides a smooth surface aligned with a surface of the door panel.

16 Claims, 10 Drawing Sheets

(51) Int. Cl.
*E05B 81/76* (2014.01)
*B60R 16/023* (2006.01)

(52) U.S. Cl.
CPC ....... *B60R 16/023* (2013.01); *E05Y 2900/531* (2013.01)

(56) References Cited

U.S. PATENT DOCUMENTS

| | | | | |
|---|---|---|---|---|
| 7,252,313 | B2* | 8/2007 | Browne | B29C 33/308 |
| | | | | 293/128 |
| 7,631,915 | B2* | 12/2009 | Browne | B60N 3/023 |
| | | | | 16/110.1 |
| 7,775,573 | B2* | 8/2010 | Lipke | B60N 3/026 |
| | | | | 296/1.02 |
| 7,900,986 | B2* | 3/2011 | Browne | B60R 11/00 |
| | | | | 296/1.07 |
| 8,052,188 | B2* | 11/2011 | Chernoff | B60N 3/023 |
| | | | | 296/1.02 |
| 8,701,353 | B2* | 4/2014 | Patel | E05B 85/103 |
| | | | | 49/503 |
| 2014/0327252 | A1* | 11/2014 | Sobecki | E05B 5/006 |
| | | | | 292/336.3 |
| 2015/0022466 | A1 | 1/2015 | Levesque | |
| 2017/0260778 | A1 | 9/2017 | Witte | |

FOREIGN PATENT DOCUMENTS

| | | |
|---|---|---|
| JP | 4751768 | 12/2007 |
| WO | 2018069129 | 4/2018 |

OTHER PUBLICATIONS

"Lever." Merriam-Webster.com Dictionary, Merriam-Webster, https://www.merriam-webster.com/dictionary/lever. Accessed Nov. 18, 2021. (Year: 2021).*

Camargo, C.J., "Batch fabrication of optical actuators using nanotube-elastomer composites toward refreshable Braille displays," Journal of Micromechanics and Microengineering (2012).

Choi, Seungyeop, "Highly flexible and efficient fabric-based organic light-emitting devices for clothing-shaped wearable displays," Scientific Reports (2017).

Truby, Ryan L., "Soft somatosensitive actuators via embedded 3D printing," Advanced Materials (2018).

* cited by examiner

FLUIDIC ELASTOMER ACTUATOR-BASED MECHANICAL CONTROL SYSTEMS FOR VEHICLE DOOR HANDLES

TECHNICAL FIELD

The present disclosure relates generally to elastomeric materials, and in particular, some implementations may relate to soft fluidic elastomer actuators and compliant mechanisms implemented within vehicle handles.

DESCRIPTION OF RELATED ART

Elastomers are polymers with viscosity and elasticity (i.e., viscoelasticity), with properties allowing considerable molecular reconformation without breaking the covalent bonds holding the atoms together. Because of these properties, elastomers can be used to create structures that change shape by the application of fluidic force, heat, electricity, and/or magnetism, among other stressors. When such external force is applied to put the elastomer under stress, the molecules of the elastomer rearrange into an intended shape. Soft robotics, the construction of robots and other devices out of highly compliant materials, is one field in which elastomers are well-suited, given the compliant-nature of elastomers.

BRIEF SUMMARY OF THE DISCLOSURE

According to various embodiments of the disclosed technology, a method for operating a fluidic elastomer handle is provided. A processor determines when a person is approaching a vehicle door and, in response to such determination, the processor determines if the door handle is necessary. In response to determining the door handle is necessary, the processor manipulates a soft robotics material enclosing the door handle into an in-use state, the in-use state presenting the door handle to the person in a usable state. When in a rest state, the soft robotics material provides a smooth surface aligned with a surface of a door panel of the vehicle door, and manipulating the soft robotics material comprises applying one or more stimuli to the soft robotics material.

Various embodiments of the disclosed technology provides a soft robotics material door handle system, the system comprising a cavity disposed in a handle area of a vehicle door, a lever disposed in the cavity, a soft robotics material enclosing the lever and the cavity, the soft robotics material being aligned with a surface of a door panel of the vehicle door when the soft robotics material is in a rest state, one or more sensors, one or more actuators configured to apply one or more stimuli to the soft robotics material, and an actuator control circuit communicatively coupled to the one or more actuators and the one or more sensors, wherein, in response to the actuator control circuit determining the lever is necessary to operate the vehicle door, the actuator control circuit controls application of one or more stimuli to the soft robotics material to manipulate the soft robotics material in an in-use state, the one or more stimuli applied using the one or more actuators.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
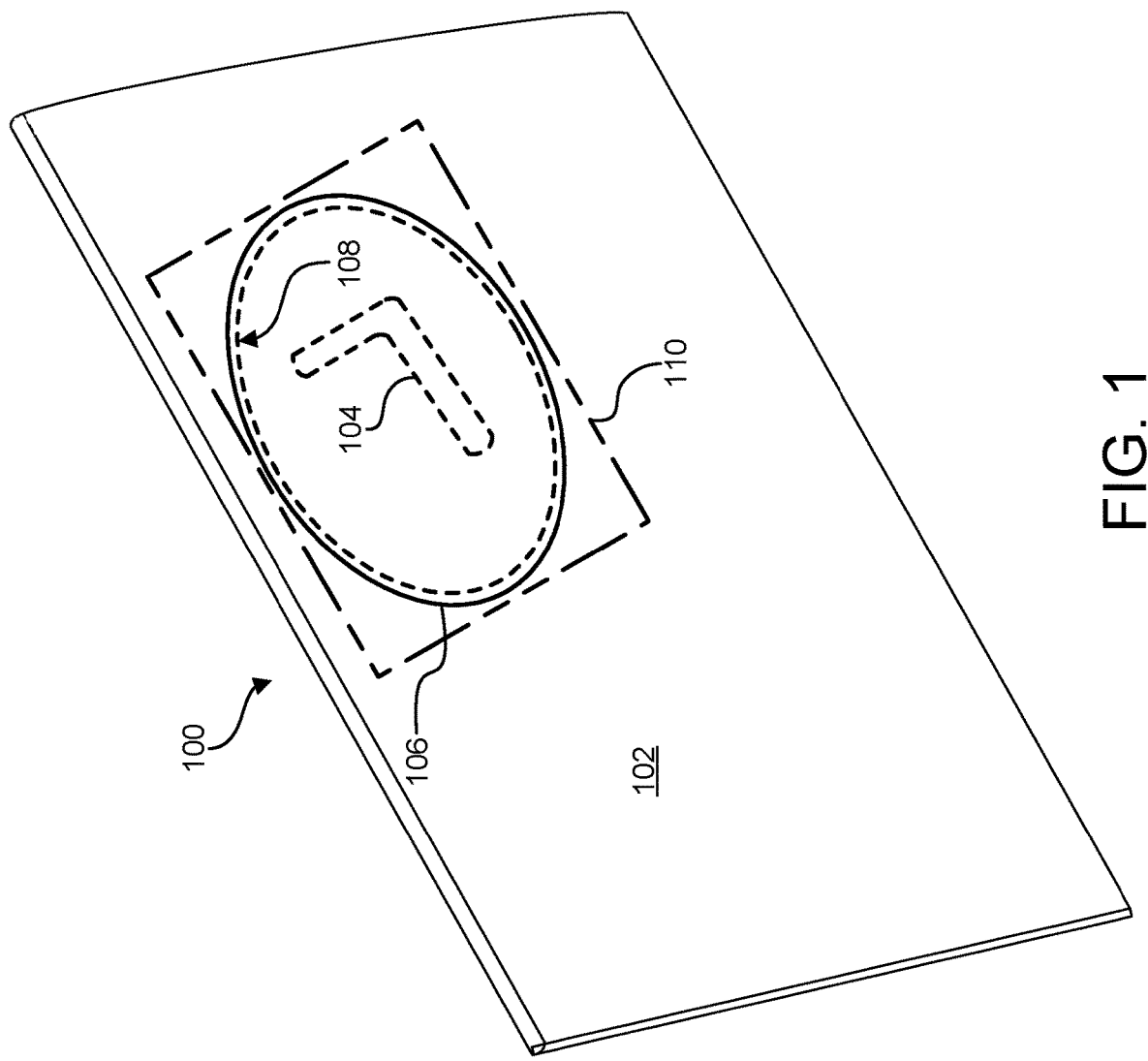
FIG. 1 illustrates an example vehicle door in accordance with embodiments of the technology disclosed herein.

The figures are not exhaustive and do not limit the present disclosure to the precise form disclosed.

DETAILED DESCRIPTION

The traditional mechanism applied to door handles has remained the same over several decades, consisting of a mechanical lever that users can pull to move a latch within the door frame. To enable a person to operate the handle, the lever is affixed such that it protrudes out from the surface of the vehicle, has an indentation or cavity disposed beneath such that a person's hand can interface with the lever, or a combination of both. The vast majority of vehicles include these types of conventional door handles, resulting in variations in the surface of the door. In some cases, this configuration can cause additional aerodynamic drag due to the placement of such inconsistencies in the surface of the door handle.

Some recent attempts have been made to design door handles which are not permanently protruding from the surface of the door, but are instead configured to be inlaid into the door panel until needed to operate the door. In some instances, push-pull levers have been used, wherein the mechanical lever is locked in a position such that it is flush or nearly flush with the surface of the door when not in operation. When a person seeks to open the door, the person first pushes on a portion of the handle, causing the mechanical lever to move out from the door handle such that a person can operate the lever. In some examples, this could include pushing on one end of the lever such that the opposite end pops out so a person can grab it, or pushing the lever in to cause the lever to then be released to move outward from the door to allow operation. Another method to try and create a smooth and clean aspect to the door handle-door interface is a self-retracting system, wherein sensors are used to sense when a person possessing a key or other beacon device is moving towards the door and, upon sensing the individual, activating an engine or motor to move the handle into an operating position outward from the door surface.

Although these other approaches are designed to provide a smoother appearance to the door when the handle is not in use, each still relies on traditional mechanics and hard robotic concepts. As such, each of these prior art solutions are constrained by the common limitations of electromechanical devices, such as engine failure and component wear. Further, reliance on such traditional technologies exposes the underlying components to potential damage when not in use due to the distinct separation needed between the door handle components and the door surface itself.

Embodiments of the systems and methods disclosed herein can provide a fluidic elastomer actuator (FEA) handle that avoids or minimizes the impact of such common limitations. Soft robotics technology, such as fluidic elastomers, are not as susceptible to the types of failures and wear of traditional hard robotics and mechanics technologies. The FEA handle in accordance with embodiments of the technology disclosed herein can be implemented as a door handle in a vehicle, enabling further streamlining of the door exterior. As discussed in greater detail below, in various embodiments, the FEA handle can comprise an elastomer material disposed over a cavity in the door handle, the elastomer material being level with the exterior surface of the vehicle. Within the cavity can be a door handle or latching mechanism, which can be made of plastic, metal, or a compliant material mechanism. In a first state, the elastomer material disposed across the cavity remains flush with the surface of the door, giving the appearance of the door surface being one continuous material. In a second state, the FEA of the handle can be activated to re-conform the elastomer material. In various embodiments, this re-conformation can be performed through application of a fluidic stressor (e.g., hydraulic action, vacuum, etc.), heat, light, electricity, and/or a magnetic field. The re-conformation results in the elastomer material changing shape such that a person would have access to the cavity of the FEA handle and, correspondingly, the latching mechanism. The person can then open the door. Other elements and characteristics of the FEA handle are discussed in greater detail in the present disclosure.

FIG. 1 illustrates an example vehicle door 100 in accordance with embodiments of the technology disclosed herein. Vehicle door 100 is provided for illustrative purposes only and should not be interpreted as limiting the scope of the technology to only the illustrated embodiment. For ease of discussion, the technology shall be discussed with reference to vehicle door 100, but a person of ordinary skill in the art would understand that the technology is applicable in other environments wherein traditional mechanics and hard robotics are utilized in a similar manner. Further, the dimensions of vehicle door 100 have been exaggerated for ease of discussion, and should not be interpreted as limiting the technology to the depicted dimensions. Although discussed with respect to exterior vehicle door handles, a person of ordinary skill in the art would understand that the technology disclosed herein can be utilized in a variety of other situations, including interior door handles, truck handles, or other scenarios where a mechanical or electro-mechanical apparatus is used.

As shown in FIG. 1, vehicle door 100 comprises a handle area 110 disposed within a door panel 102. In various embodiments, the handle area 110 may be disposed anywhere within vehicle door 100. In vehicles with traditional door handles, the handle area 110 would comprise a handle extending outward from the surface of the door panel 102 and a permanent cavity into which a person can insert a hand to grasp and operate the handle.

Unlike traditional door handles, embodiments of the present disclosure provide a soft robotics-based door handle solution to address the deficiencies of solely-mechanical solutions discussed above. Rather than providing a rigid mechanical solution, the soft robotics-based door handle allows for dynamic presentation of the lever to a user. This type of dynamic presentation is similar to the electronically-controlled or inlaid mechanical door handles, but unlike those previous solutions, the soft robotics-based handle protects the operatively-lever by enclosing the lever 104 with a soft robotics material 106, as shown in FIG. 1. In this way, when not in use, the lever 104 and other components of the latching system are protected to avoid external factors that attribute to wear and mechanical failure of traditional and inlaid handles. The lever 104 can be disposed in a cavity 108 within the handle area 110 such that the lever 104 does not extend beyond the surface of the door panel 102. The soft robotics material 106 can stretch across the opening of the cavity 108 to enclose the lever 104, thereby hiding the lever 104 from sight.

In various embodiments, the soft robotics material 106 can comprise an elastomer or a stretchable fabric covered with an elastomer. In other embodiments, other types of viscoelastic polymers can be used, based on the type of actuation system(s) implemented. The soft robotics material 106 provides a smooth surface when not in use. In this way, the soft robotics material 106 can be configured to align with the shape and curvature of the surface of the door panel 102, resulting in a consistently smooth surface when the lever 104 is not in use in some embodiments. In other embodiments, the soft robotics material 106 can provide a smooth surface that is not aligned with the shape and curvature of the surface of the door panel 102, but does provide a smooth surface rather than having a permanent lever.

In some embodiments, the lever 104 can also be constructed from soft robotics material, similar to the soft robotics material 106. Although protecting a mechanical-type lever using the soft robotics material 106 provides benefits over the current solutions, replacing a mechanical handle with a soft robotics handle further reduces the effect of stress on the system, which generally induces cracks and strains in mechanical components much sooner than in soft robotics-type devices. Therefore, by implementing lever 104 as a soft robotics handle further increases the life cycle of the vehicle door handle, making the overall system more robust. In various embodiments, the soft robotics handle-type lever 104 can be implemented as a second type of soft robotics element in addition to the soft robotics material 106, while in other embodiments the soft robotics material 106 can have the soft robotics handle-type lever 104 designed into the soft robotics material 106 such that, when stimuli is properly applied, the soft robotics handle-type lever 104 is presented to the user within the soft robotics material 106. In some embodiments, the soft robotics handle-type lever 104 may be made of a different type of soft robotics substance than the soft robotics material 106 covering the handle area 110, having different stimuli to cause changes in the material shape.

Figure 2A:
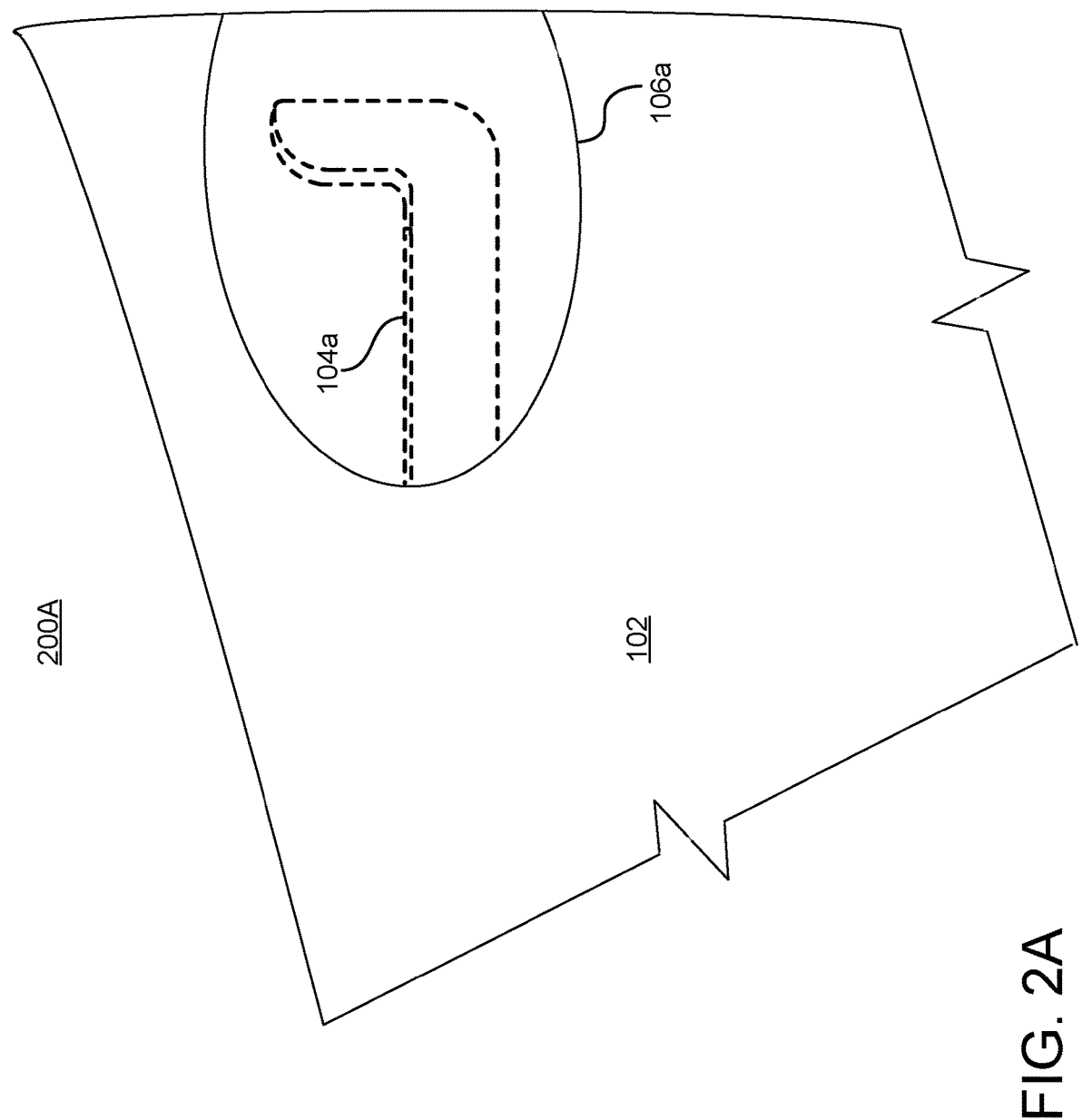
FIG. 2A illustrates an example soft robotics vehicle door handle in a rest state in accordance with embodiments of the technology disclosed herein.
Figure 2B:
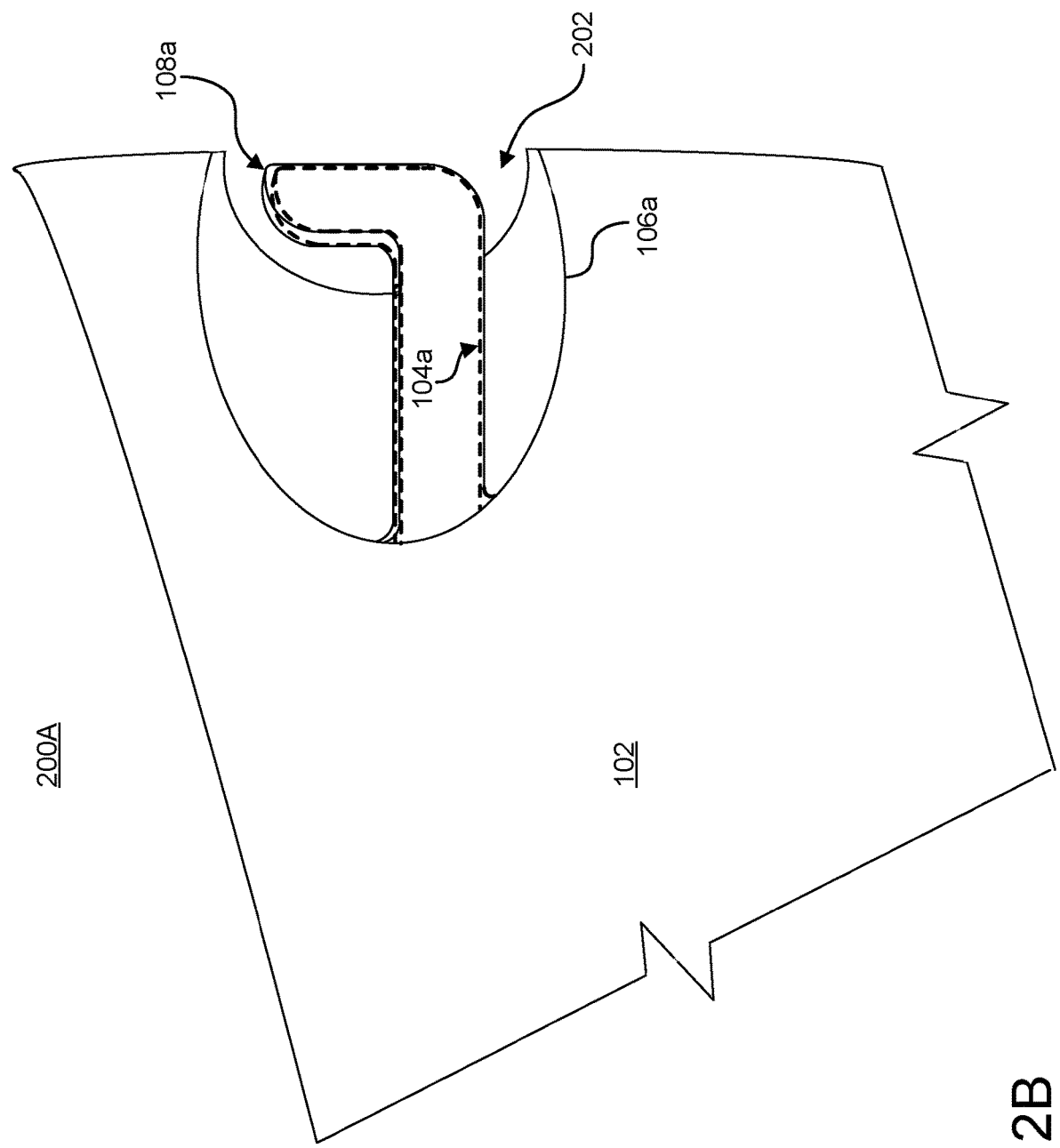
FIG. 2B illustrates the example soft robotics vehicle door handle of FIG. 2A in an in-use state in accordance with embodiments of the technology disclosed herein.

FIGS. 2A and 2B illustrate the operation of an example soft robotics vehicle door handle 200A in accordance with embodiments of the present disclosure. The soft robotics vehicle door handle 200A is similar to the handle system illustrated in the door handle area 110 discussed above with respect to FIG. 1. Where a reference is common between the figures it should be interpreted that the description of the reference with respect to any figure is applicable to all instances of the reference unless explicitly stated otherwise. Soft robotics vehicle door handle 200A is provided for illustrative purposes only and should not be interpreted as limiting the scope of the technology disclosed herein.

FIG. 2A illustrates an example soft robotics vehicle door handle 200A in an unused state. As shown, when not in use the soft robotics material 106a extends over the lever 104a, hiding the lever 104a from view such that a person looking at the door would not know the lever 104a was included within the door panel 102. The embodiment of FIGS. 2A and 2B shows an embodiment where the lever 104a is separate from the soft robotics material 106a, such as a mechanical lever or a separate soft robotics handle-type lever. The soft robotics material 106a provides a smooth surface that is aligned with the surface of the door panel 102.

When the soft robotics vehicle door handle 200A is to be used (e.g., a person is reaching to open the door), one or more actuators can be activated to manipulate the soft robotics material 106a to reveal the lever 104a in an in-use state, as shown in FIG. 2B. As shown in FIG. 2B, the soft robotics material 106a is manipulated such that the lever 104a becomes accessible to a user. Because the soft robotics material 106a encloses the lever 104a, although accessible in FIG. 2B, a person viewing the door from a distance would not see the lever 104a, instead seeing a smooth door panel surface 102. The soft robotics material 106a is configured to stretch over the lever 104a, resulting in a lever-shape deformation 108a to be visible on the door. In this way, the lever 104a and other components (e.g., mechanical and/or electrical components) within the cavity (not shown) remain protected from external factors while still allowing operation of the door latch. Manipulation of the soft robotics material 106a further results in a void 202 configured to enable a person to grip the lever 104a (through the soft robotics material 106a). The way in which the soft robotics material 106a may be manipulated shall be discussed in greater detail with respect to FIG. 3.

The form factor of lever 104 can vary depending on the implementation, and the illustrated embodiment should not be interpreted as limiting the lever 104 to only the shape shown in FIG. 2B. A person of ordinary skill in the art would understand that the technology disclosed herein is applicable to any type or shape of lever 104 used in a vehicle door latch system.

Figure 2C:
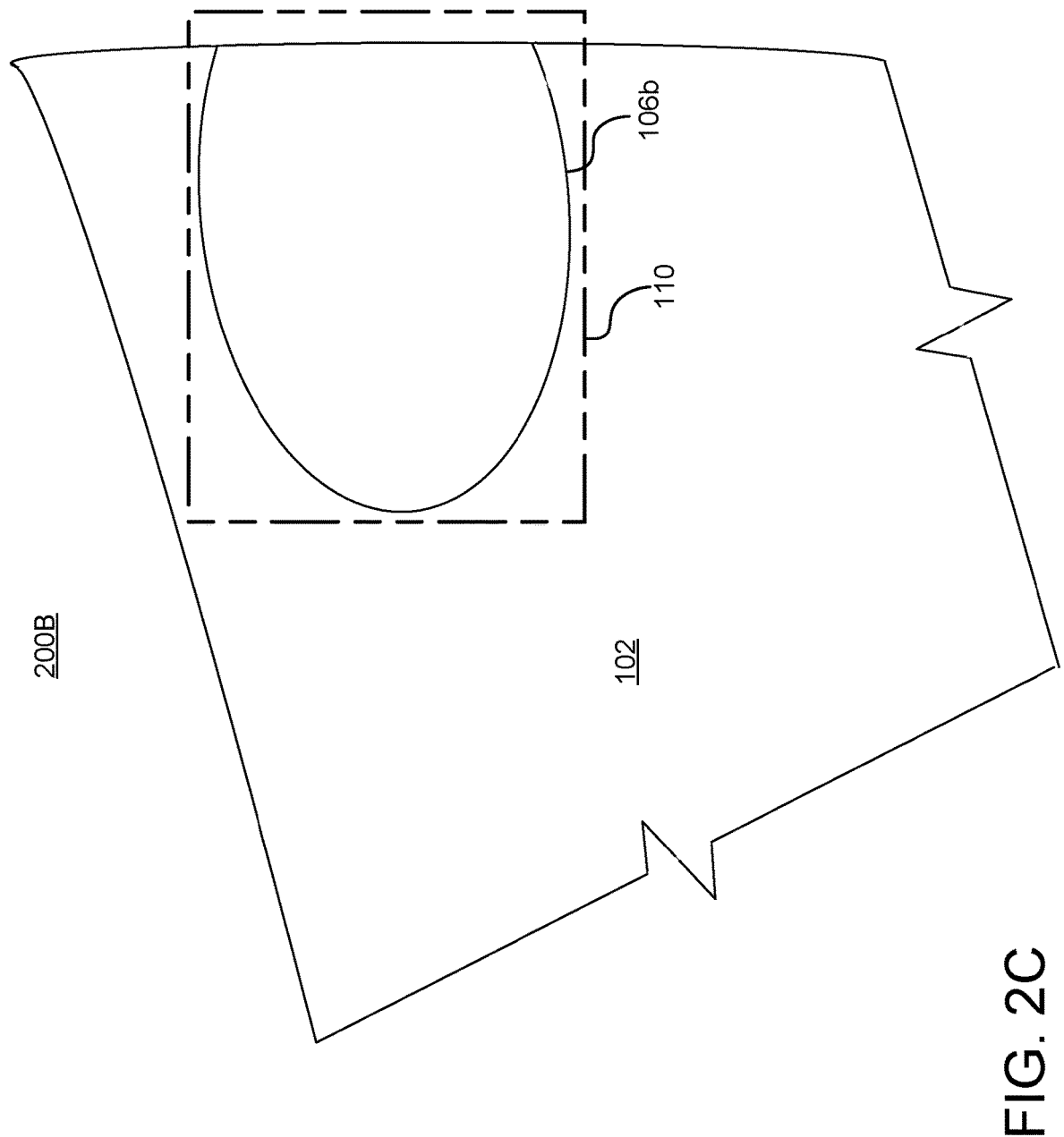
FIG. 2C illustrates another example soft robotics vehicle door handle in a rest state in accordance with embodiments of the technology disclosed herein.
Figure 2D:
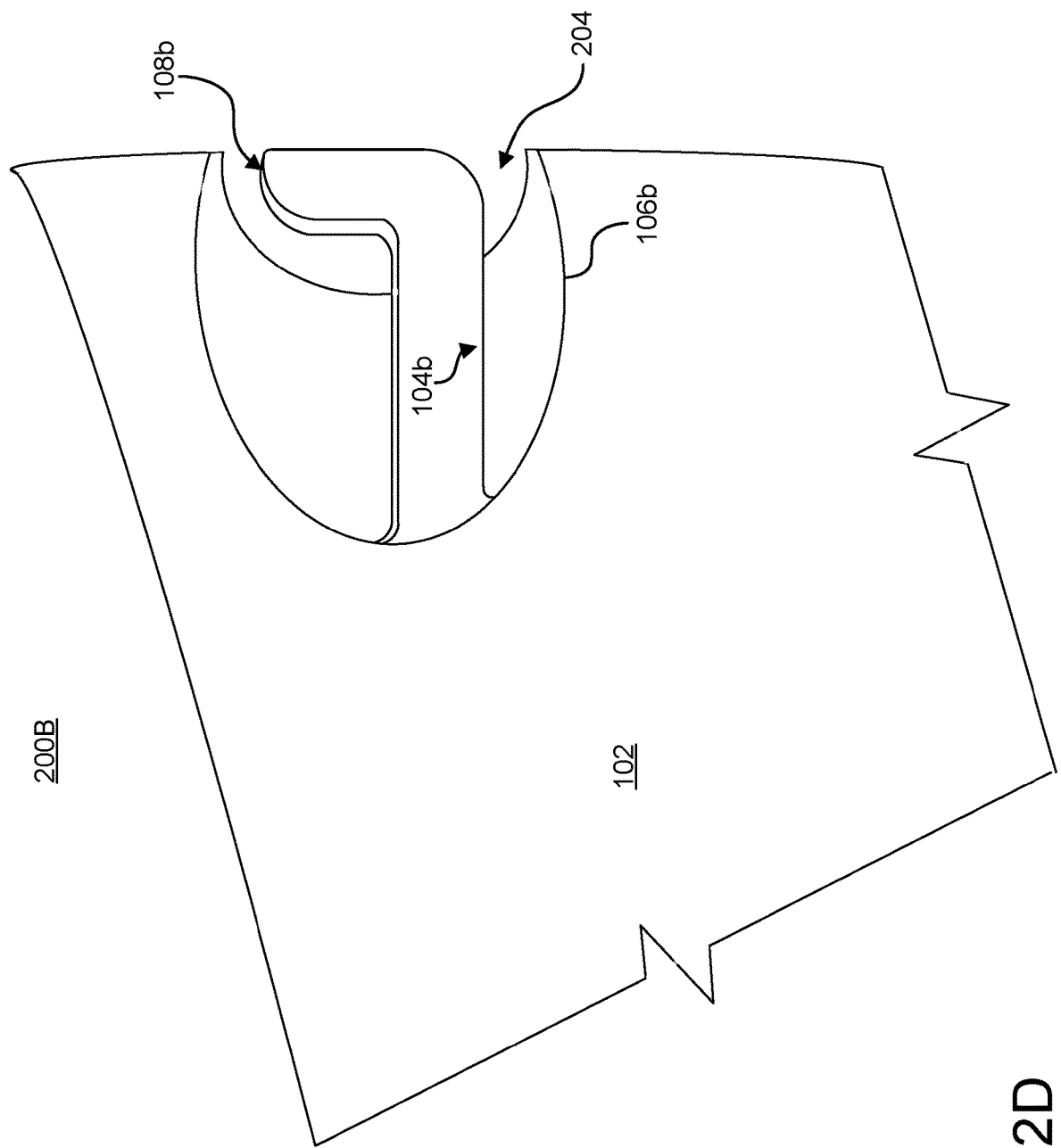
FIG. 2D illustrates the example soft robotics vehicle door handle of FIG. 2C in an in-use state in accordance with embodiments of the technology disclosed herein.

FIGS. 2C and 2D illustrate the operation of another example soft robotics vehicle door handle 200B in accordance with embodiments of the present disclosure. The soft robotics vehicle door handle 200B is similar to the handle system illustrated in the door handle area 110 discussed above with respect to FIG. 1. Where a reference is common between the figures it should be interpreted that the description of the reference with respect to any figure is applicable to all instances of the reference unless explicitly stated otherwise. Soft robotics vehicle door handle 200B is provided for illustrative purposes only and should not be interpreted as limiting the scope of the technology disclosed herein.

FIG. 2C illustrates an example soft robotics vehicle door handle 200B in an unused state. As shown, when not in use the soft robotics material 106 extends across the handle area 110. Unlike the example soft robotics vehicle door handle 200A, the soft robotics vehicle door handle 200B does not cover a separate lever 104, but instead is designed such that the lever 104 is part of the soft robotics material 106. In other words, the soft robotics material 106 is designed such that, when stimuli is applied, the lever 104 is formed from the soft robotics material 106 itself. In such embodiments, the soft robotics material 106 can include an interface (not shown) to the latching mechanism of the door (e.g., a part of the soft robotics material 106 may be permanently attached to the latching mechanism) or can be configured to contact the latching mechanism when in use (e.g., the soft robotics material 106 is configured to collapse around the latching mechanism when stimuli is applied such that force applied to the soft robotics handle-type lever causing the latching mechanism to be engaged/disengaged). The soft robotics material 106 provides a smooth surface that is aligned with the surface of the door panel 102. As shown, the built-in lever is not visible in the soft robotics material 106 when in an unused state, but in some embodiments an outline of the lever may be visible.

When the soft robotics vehicle door handle 200B is to be used (e.g., a person is reaching to open the door), one or more actuators can be activated to manipulate the soft robotics material 106 to present the built-in version of lever 104a, as shown in FIG. 2D. As shown in FIG. 2D, the soft robotics material 106 is manipulated such that the built-in version of lever 104a becomes accessible to a user. The soft robotics material 106 is configured to deform to form the built-in version of lever 104a. Manipulation of the soft robotics material 106 further results in a void 204 configured to enable a person to grip the built-in version of lever 104a. The way in which the soft robotics material 106 may be manipulated shall be discussed in greater detail with respect to FIG. 3.

Figure 2E:
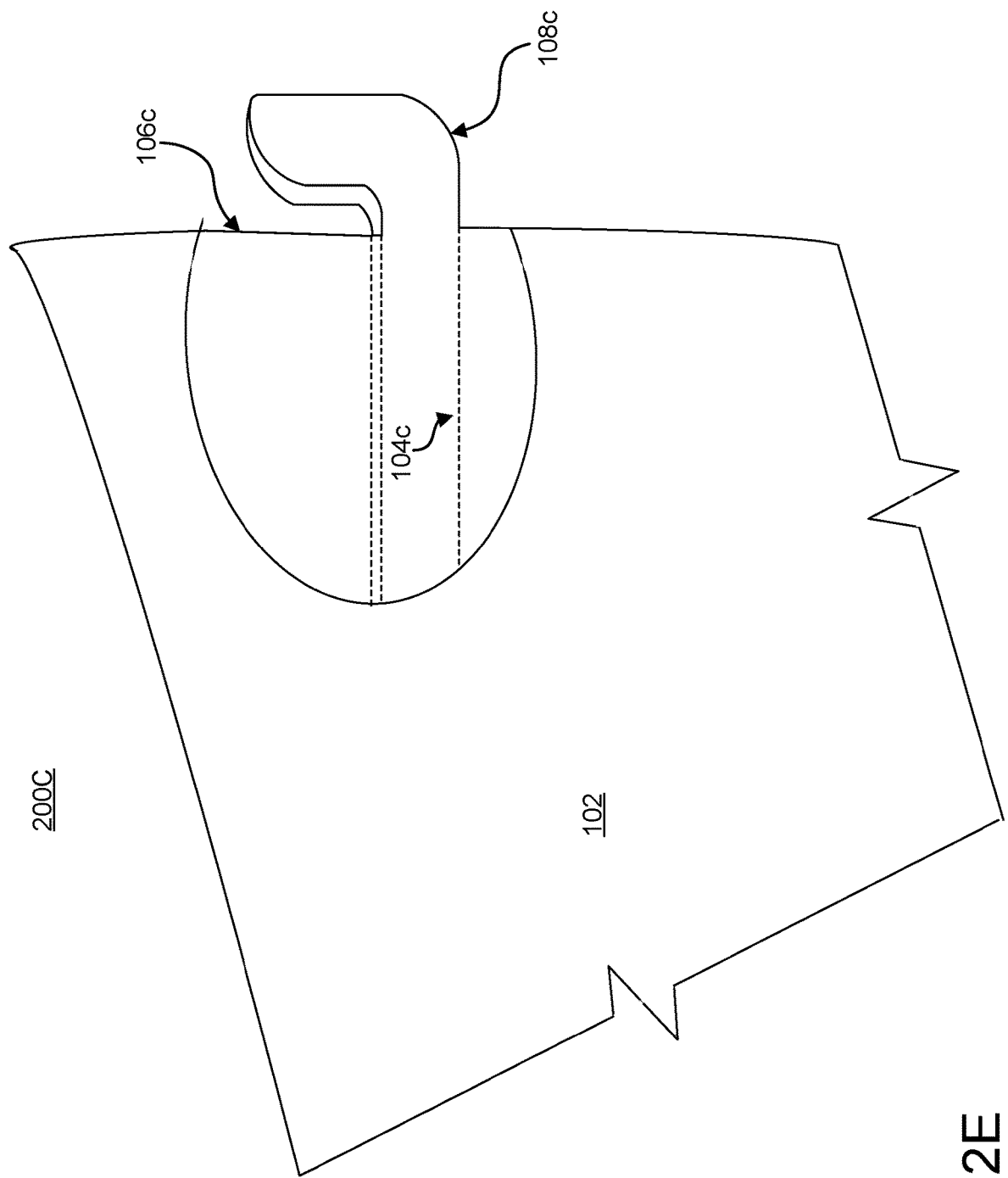
FIG. 2E illustrates another example soft robotics vehicle door handle in an in-use state in accordance with embodiments of the technology disclosed herein.
Figure 2F:
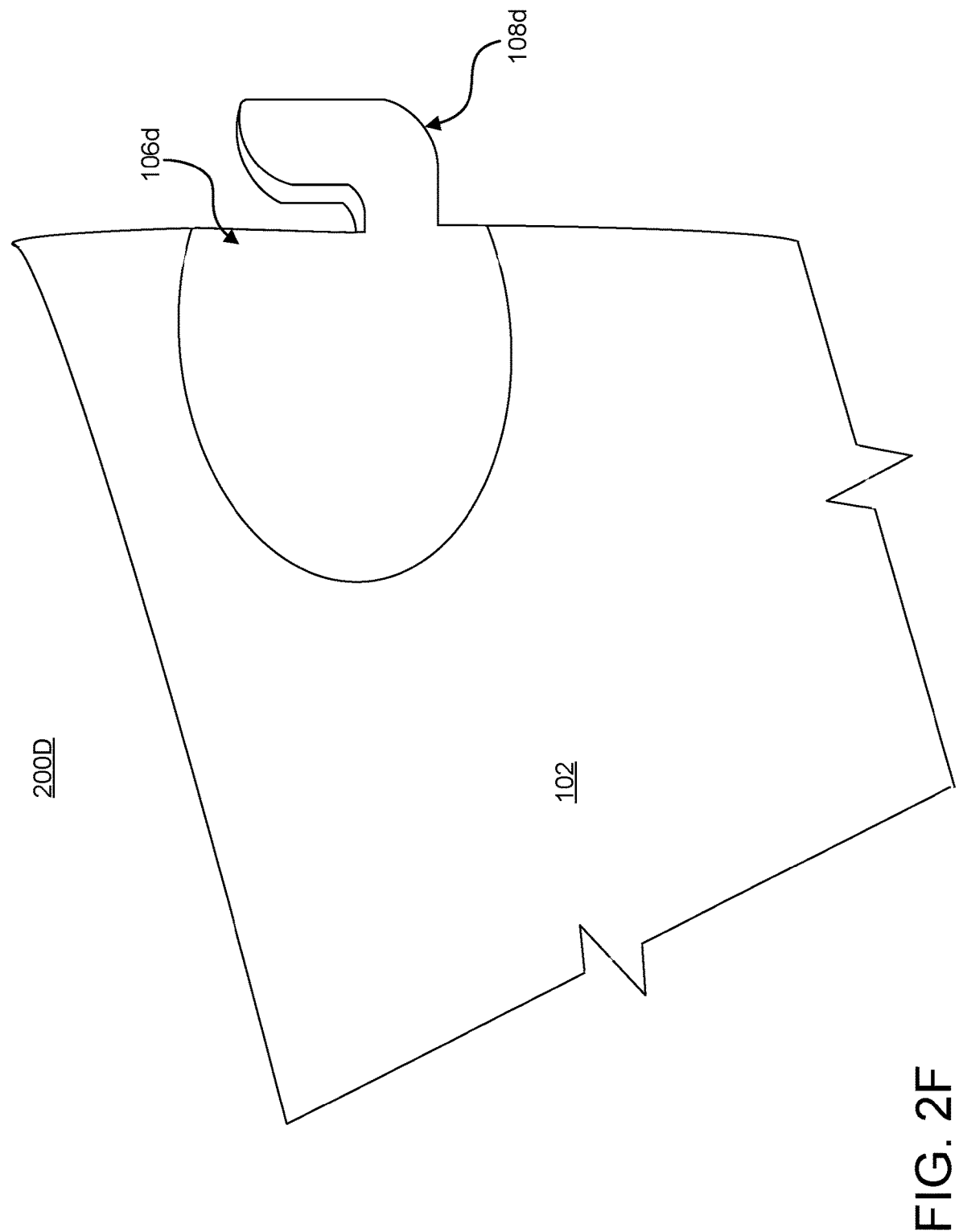
FIG. 2F illustrates another example soft robotics vehicle door handle in an in-use state in accordance with embodiments of the technology disclosed herein.

In other embodiments, the soft robotics vehicle door handle may be configured such that the in-use state comprises the lever being deployed (i.e., forming a protrusion outward from the surface of the door panel 102) rather than causing the soft robotics material to deform into the door panel 102. FIG. 2E illustrates an example soft robotics vehicle door handle 200C in accordance with the technology disclosed herein. The soft robotics vehicle door handle 200C may be similar to the soft robotics vehicle door handle 200A, including a mechanical-type lever, a soft robotics handle-type lever, or a combination of both. As shown in FIG. 2E, rather than the soft robotics material 106c being deformed inward (like in FIG. 2B), the lever 104c is deployed by extending outward from the door panel 102, thereby deforming the soft robotics material 106c around the end of the lever 104c to form an extended protrusion 108c. In such embodiments, the person is capable of interacting with the extended protrusion 108c away from the vehicle. FIG. 2F illustrates an example soft robotics vehicle door handle 200D similar to the soft robotics vehicle door handle 200B discussed with respect to FIG. 2D. As shown, in such embodiments, the soft robotics material 106d can be configured to form a lever-shape deformation 108d extending outward from the surface of the door panel 102. In various embodiments, the lever-shape deformation 108d may have material characteristics such that the soft robotics material 106d of the lever-shape deformation 108d is capable of handling stress, such as pressure caused by a person grabbing the deformation 108d. The person is capable of interacting with the lever-shape deformation 108d to operate the vehicle door. As illustrated, the remainder of the soft robotics material 106d may remain undeformed.

Figure 3:
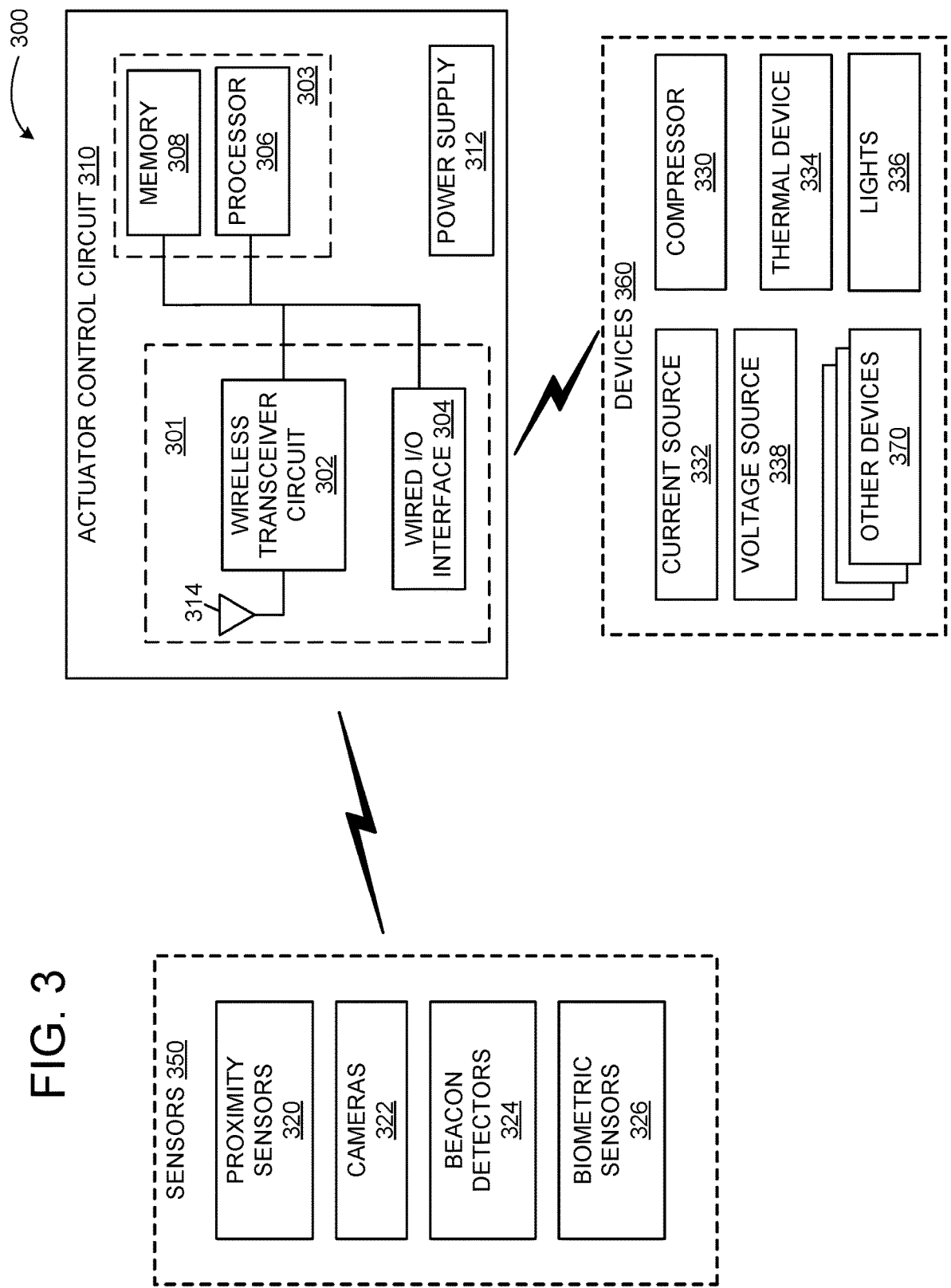
FIG. 3 is an example architecture for operating a soft robotics vehicle door handle system in accordance with embodiments of the technology disclosed herein.

FIG. 3 illustrates an example architecture for operating a soft robotics vehicle door handle system 300 in accordance with embodiments of the present disclosure. The soft robotics vehicle door handle system 300 can be used to control manipulation of the soft robotics material 106 of the example soft robotics vehicle door handles 200A and 200B discussed with respect to FIGS. 2A-2D. Referring now to FIG. 3, in this example, soft robotics vehicle door handle system 300 includes an actuator control circuit 310. Actuator control circuit 310 can be implemented as an electronic control unit (ECU), as part of an ECU, or independently of the ECU.

Actuator control circuit 310 in this example includes a communication circuit 301, a decision circuit 303 (including a processor 306 and memory 308 in this example) and a power supply 312. Components of actuator control circuit 310 are illustrated as communicating with each other via a data bus, although other communication in interfaces can be included.

Processor 306 can include a GPU, CPU, microprocessor, or any other suitable processing system. The memory 308 may include one or more various forms of memory or data storage (e.g., flash, RAM, etc.), and can be made up of one or more modules of one or more different types of memory, and may be configured to store data and other information as well as operational instructions that may be used by the processor 306 to perform the functions of the actuator control circuit 310. In various embodiments, the processor 306 may be configured to execute non-transitory machine readable instructions stored on memory 308 to apply one or more models to determine the intention of a person to use the door handle and, therefore, whether to activate the one or more devices 360 to present the handle/lever to the person.

Although the example of FIG. 3 is illustrated using processor and memory circuitry, as described below with reference to circuits disclosed herein, decision circuit 303 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up an actuator control circuit 310.

Communication circuit 301 can include either or both of a wireless transceiver circuit 302 with an associated antenna 314 and a wired I/O interface 304 with an associated hardwired data port (not illustrated). As this example illustrates, communications with actuator control circuit 310 from sensors 350, devices 360, or both can include either or both wired and wireless communications circuits 301. Wireless transceiver circuit 302 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 314 is coupled to wireless transceiver circuit 302 and is used by wireless transceiver circuit 302 to transmit radio signals wirelessly to wireless equipment with which it is connected and to receive radio signals as well. These RF signals can include information of almost any sort that is sent or received by the actuator control circuit 310 to/from other entities, such as the other components shown in FIG. 3.

Wired I/O interface 304 can include a transmitter and a receiver (not shown) for hardwired communications with other devices. For example, wired I/O interface 304 can provide a hardwired interface to other components of the system. Wired I/O interface 304 can communicate with other devices using Ethernet or any of a number of other wired communication protocols whether standardized, proprietary, open, point-to-point, networked or otherwise.

Power supply 312 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

A plurality of sensors 350 and devices 360 may be utilized to operate the soft robotics vehicle door handle. The actuator control circuit 310 receives data from the one or more sensors 350 in order to decide when the door handle will need to be in use (e.g., a person wants to open the door), and in response executes instructions concerning operation of one or more devices 360. As shown in FIG. 3, sensors 350 can include one or more proximity sensors 320, cameras 322, beacon detectors 324, and biometric sensors 236. In some embodiments, additional sensors may be included. Proximity sensors 320 can comprise one or more sensors designed to detect when a person is approaching the vehicle door by looking for changes in electromagnetism caused by an object within a certain area. Non-limiting examples of proximity sensors include capacitive sensors, capacitive displacement sensors, radar, LIDAR, infrared (IR) sensors, ultrasound sensors, capacitance sensors, sweat sensors, and hall effect sensors, among others. In various embodiments, one or more proximity sensors 320 may be built into the soft robotics material 106, contained within the cavity covered by the soft robotics material 106, in the door frame, on or in the door panel, or any other location on the vehicle suitable for sensors of the type.

In various embodiments, a plurality of proximity sensors 320 can be used. Data collected by the one or more proximity sensors 320 can be communicated to the actuator control circuit 310 through the communications circuit 301 for use by the decision circuit 303 in determining whether the door handle is needed (i.e., to determine the intent of the person to access the handle).

Various embodiments may include one or more cameras 322. In various embodiments, the one or more cameras 322 can be disposed on the door assembly, the side view mirror, within the soft robotics material 106, or a combination thereof. In some embodiments, cameras 322 included within the vehicle for other purposes may be in communication with the actuator control circuit 310 to serve another function, such as but not limited to driver-facing cameras within the interior of the vehicle. In such embodiments, the actuator control circuit 310 could be part of the ECU or an independent circuit from the ECU. The one or more cameras 322 can be used to capture the scene around the door to determine whether a person is in the scene, and whether the person is approaching the door.

In embodiments where the soft robotics door handle system is being used for an interior door handle or other button, the one or more cameras 322 can be used to capture the person in relation to the interior of the door. Capturing this information is useful for determining a person's intention to use the interior handle because in such situations proximity sensors (e.g., proximity sensors 320) may be of limited use due to the natural proximity of a person to the interior of the door when seated. In such embodiments, the data collected by the one or more cameras 322 of the person in relation to the interior of the door may be communicated to the actuator control circuit 310 and used in determining the intention of the person to use the interior handle.

In some embodiments, the cameras 322 may include person identification technologies (i.e., hardware and/or software) designed to parse and identify persons from other objects within a scene, while in other embodiments the decision circuit 303 can be configured to store (in memory 308) non-transitory machine readable instructions executable by the processor 306 to perform a variety of computer vision techniques for person identification (e.g., bounding boxes). In some embodiments, proximity sensors 320 and cameras 322 can be implemented within the same component. In some embodiments, the one or more cameras 322 (and/or other sensors, such as an ultrasound sensor) can be utilized to capture and recognize gestures of a person that are useful for determining the intent of the person to use the handle.

Not all persons who approach a vehicle door intend, or have the right, to open the door. As a non-limiting example, a car thief may approach the vehicle door. In another non-limiting example, a person might approach a vehicle, mistakenly thinking it is his or hers, or simply walk close to a vehicle door while walking down a crowded sidewalk or through a parking lot. In such scenarios, presenting the door handle to the individual is unnecessary. To ensure that the soft robotics vehicle door handle system 300 is activated only when needed, one or more beacon detectors 324 may be used. In various embodiments, beacon detectors 324 can comprise one or more sensors configured to detect the presence of an electronic key associated with the vehicle. Many vehicles have electronic keys providing remote entry, wherein a person can unlock the vehicle without inserting a physical key into a keyhole on the door. One or more beacon detectors 324 can be configured to detect one or more signals emitted from such electronic keys. When such signals are detected, it is an indication that a person may be approaching and desiring to enter the vehicle, necessitating the indication of the lever 104 to the person.

In some embodiments, beacon detectors 324 may be sensors configured to detect an expected signal emitted from a token, fob, or other portable device that can be on a person. In various embodiments, the beacon detectors 324 can be configured to detect a plurality of different signal types, including wifi, near field communication (NFC), Bluetooth, Bluetooth Low Energy (BLE), RFID, among others. Non-limiting examples of portable devices include mobile phones, smart watches, key fobs, BLE beacons, tablets, among others. Beacon detectors 324 can be configured to detect signals emitted from both passive or active beacon devices. The beacon detectors 324 can communicate the detected signals to the actuator control circuit 310, wherein the decision circuit 303 can determine whether the detected signal is associated with the vehicle and, therefore, if the person approaching is authorized to enter the vehicle. In various embodiments, an access control list (ACL) or other database identifying known and authorized signals can be stored in memory 308.

In some embodiments, one or more biometric sensors 326 may be included in the soft robotics vehicle door handle system 300. Biometric sensors 326 may be utilized in determining the intention of a person to utilize a handle and/or for security/authentication purposes. Non-limiting examples of biometric sensors 326 include fingerprint readers, iris scanners, voice readers, pulse sensor, among others. Data collected from one or more biometric sensors 326 can be communicated to and used by the actuator control circuit 310 (in decision circuit 303) to determine the intent of an individual to use the door handle in various embodiments. In some embodiments, the data from one or more biometric sensors 326 can be used to ensure that the person intent on using the handle is authorized to do so (e.g., a list of authorized drivers can be stored in memory 308 and only those permitted to operate the vehicle will cause activation of the one or more devices 360 to present the driver-side handle to the person).

In some embodiments, the one or more biometric sensors 326 can include one or more sensors designed to detect muscle activity, gestures, or brain activity, included but not limited to an electroencephalogram (EEG) sensor or an electromyography (EMG) sensor.

The actuator control circuit 310 can be configured to use the data received and/or pulled from the sensors 350 to determine whether there is a need to manipulate the soft robotics material enclosing the lever. If a determination is made that the lever should be presented, the actuator control circuit 310 can operate one or more devices 360 for use in presenting the lever to the person. Devices 360 can include one or more types of actuators configured to apply some type of stimuli to the soft robotics vehicle door handle designed to manipulate the soft robotics material. Soft robotics materials are designed such that one or more characteristics of the material can change with the application of certain stimuli. Non-limiting examples of stimuli include heat, light, current, and pressure (e.g., vacuums). In some embodiments, the soft robotics material may be susceptible to changes based on more than one type of stimuli, with the different stimuli causing different changes in the soft robotics material. For example, in various embodiments a compressor 330 may be included within the soft robotics vehicle door handle system 300. The compressor 330 can be used with soft robotics materials having good elasticity (e.g., elastomers) to cause the soft robotic material to stretch and deform over hidden shapes (i.e., the lever). When not in use, the cavity and/or the soft robotics material itself can be filled with a fluid to inflate the soft robotics material such that it provides the smooth surface discussed with respect to FIGS. 1 and 2A. When a person approaches, the compressor can be turned on to vacuum the fluid, thus causing the soft robotics material to collapse into the cavity, as shown in FIG. 2B. In various embodiments, the fluid can be a liquid or a gas. In some embodiments, the soft robotics material may be configured to take on a particular shape when fluid is added, and in such embodiments, one or more of the compressors 330 can push the fluid into the cavity or the soft robotics material to cause the shape to occur.

The soft robotics vehicle door handle system 300 may further include a current source 332 and/or voltage source 338. Various soft robotics materials can be controlled using electrical signals, such as electroactive polymers. By applying an electrical signals to the material it can be controlled to take on a variety of characteristics, from varying hardness to different shapes. In embodiments where the soft robotics material comprises an electrically-controlled material, voltage source 332 and/or current source 338 can be used to apply the necessary electrical signal to the material. In some embodiments, the power supply 312 can serve as the voltage source 332 and/or the current source 338, while in other embodiments the voltage source 332 and/or the current source 338 may be a battery or other electrical storage device disposed in or near the soft robotics vehicle door handle. In some embodiments, the voltage source 332 and/or the current source 338 can be turned on when it is determined that the handle/lever needs to be used. In various embodiments, applying the electrical signal can comprise flipping a switch to connect the voltage source 332 and/or the current source 338 to one or more leads of the soft robotics material.

Another device 360 that may be used to manipulate the soft robotics material can be a thermal device 334. Thermal device 334 can be configured to change the temperature of the soft robotics material, causing the characteristics of the material to change. In various embodiments, the thermal device 334 can be disposed on the soft robotics material, while in other embodiments the thermal device 334 can be independent of but communicatively in contact with the soft robotics material (e.g., inductive heating). Some soft robotics materials can be controlled by light. In such embodiments, one or more lights 336 can be used to control the material. In various embodiments, the lights 336 can be dispersed within the cavity of the soft robotics vehicle door handle, on or within the soft robotics material, apart from the door handle area of the door panel, or a combination therein. When in use, the lights 336 can be used to shine the necessary light signal onto the soft robotics material to cause the change in characteristics. Non-limiting examples of lights 336 include light emitting diodes (LEDs), organic LEDs (OLEDs), polymer LEDs, laser diode, among others. In some embodiments, lights 336 can also be used to illuminate the area around the door handle in addition to controlling manipulation of the soft robotics material. As a non-limiting example, lights 336 can be dispersed within soft robotics material 106. When in use, the lights 336 can be turned on to cause the soft robotics material to change shape. In addition, the lights 336 can be disposed such that, when illuminated, the lights outline the shape of the lever to help a person find the lever.

In some embodiments, one or more other devices 370 may be included in soft robotics vehicle door handle system 300. Such additional devices 370 may be included to provide additional feedback to the person or to assist in indicating the presence of the door handle. As a non-limiting example, the other devices 370 may include one or more motion actuators configured to vibrate the lever 104, the soft robotics material 106, or both.

Figure 4:
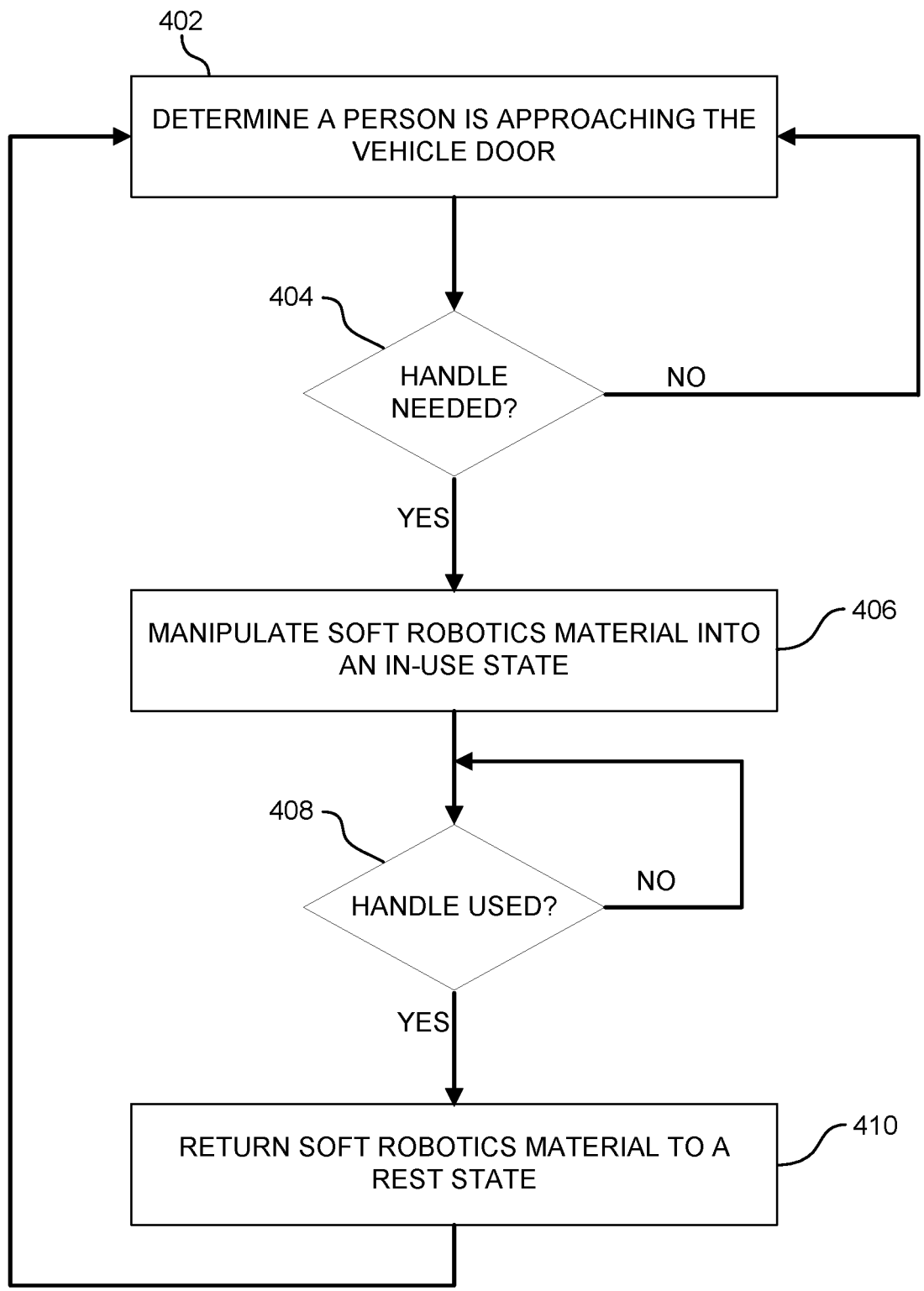
FIG. 4 is an example method in accordance with embodiments of the technology disclosed herein.

FIG. 4 is an example method 400 for a soft robotics vehicle handle in accordance with embodiments of the present disclosure. The method 400 can be used to control the operation of the soft robotics vehicle door handle discussed with respect to FIGS. 1-3 above. Method 400 is provided for illustration only and should not be interpreted as the only method for operating a soft robotics vehicle door handle within the scope of the present disclosure. The example method 400 may be stored in a non-transitory machine readable storage media and executable by a processor, such as the processor 306 and memory 308 discussed above with respect to FIG. 3 (i.e., decision circuit 303).

As shown in FIG. 4, method 400 starts at operation 402, where it is determined if a person is approaching the vehicle door. It is assumed that the soft robotics vehicle door handle system within the vehicle door is in a rest state, wherein the soft robotics material is configured to provide the smooth surface discussed above with respect to FIGS. 1 and 2A. In some embodiments, the rest state may comprise a compressor pushing a fluid into the cavity and/or the soft robotics material to put the soft robotics material into the rest state (i.e., aligned with the surface of the door panel, as discussed above with respect to FIGS. 1 and 2A). In other embodiments, the soft robotics material may be designed such that it is in a shape consistent with the surface of the door panel and with sufficient rigidity to maintain that shape. At operation 402, data from a plurality of sensors may be received by the processor. The sensors can comprise one or more of the sensors discussed with respect to FIG. 3 above.

Referring to FIG. 4, in response to receiving data indicating that a person is detected approaching the vehicle door, the processor can decide whether it is necessary to highlight the door handle/lever to the person at decision 404. In various embodiments, deciding if the handle is needed can be determined by analyzing the received data. As a non-limiting example, if data from the proximity sensor indicates that a person is near the vehicle door, the processor could compare the data against a proximity threshold representing a minimum distance from the vehicle door a person needs to be before a determination can be made that the person intends to open the door (i.e., person must be within six inches of the door). As another non-limiting example, the camera data could detect that a hand is stretching out to the door, indicating an intent to open the door. In various embodiments, more than two metrics may be used to make the decision 404. As a non-limiting example, the processor may expect both a proximity metric and a beacon metric to be determined. The data from the proximity sensor may indicate that a person is within a threshold distance of the vehicle door, but the beacon detectors may not have detected an expected signal. Because of this, the processor may decide that the handle is not needed as the person is not authorized to open the door (i.e., the person is determined not to be intending to open the door).

In response to determining the handle is not needed, method 400 can return back to operation 402 and start the method 400 again. In some embodiments, operation 402 may be a continuous operation, while in other embodiments operation 402 may be triggered by one or more sensors detecting some change indicative of a potential person. As a non-limiting example, operation 402 may be triggered if the proximity sensor detects a person, regardless of whether the person is within the threshold distance discussed above.

In response to determining the handle is needed at decision 404, method 400 moves to operation 406, wherein the soft robotics material is manipulated into an in-use state. Manipulating the soft robotics material can be performed in a manner like that discussed above with respect to FIG. 3, including temperature-, light-, current-, and/or pressure-control. An in-use state can comprise either deforming the soft robotics material such that components enclosed within become accessible to the person in some embodiments, while in other embodiments manipulation could comprise changing the shape and/or rigidity of the soft robotics material. In various embodiments, the soft robotics material could be designed such that one or more detail features can also be generated, including but not limited to ridges, grooves, finger grips, or other structures on the surface of the soft robotics material to provide tactile feedback to the person. In some embodiments, the stimuli applied to the soft robotics material at operation 406 can cause a change in the color of the soft robotics material in addition to other characteristics. Manipulating the soft robotics material at operation 406 can further include controlling one or more devices included in the soft robotics vehicle door handle, such as the lights, one or more motion actuators, or others.

After manipulating the soft robotics material, the processor can keep the soft robotics material in the in-use state until the person has opened the door. One or more additional usage detectors may be included in the system, configured to detect if the door was opened and closed (as expected of a person looking to enter the vehicle). At decision 408, the processor can determine if the handle has been used based on the usage detectors. In response to determining the handle had not been used yet, the method 400 can loop back to consider if the handle is used. In this way, the soft robotics material can be maintained in the in-use state until used. In response to determining that the handle had been used at decision 408, the soft robotics material can be returned to the rest state at operation 410. In various embodiments, returning to the rest state may comprise removing the stimuli applied at operation 406, thereby reversing the characteristic changes cause by the stimuli. After returning to the rest state, the method 400 loops back to operation 402, like the loop discussed above with respect to decision 404.

Although discussed with respect to the exterior handle of a vehicle door, the technology of the present disclosure is suitable and applicable for any type of mechanical control. Non-limiting examples include buttons, knobs, switches, pull handles, among others. As a non-limiting example, a person of ordinary skill in the art would appreciate that the technology could be implemented for temperature controls for a heating and cooling system, or for the pull handle of a trunk lid. In addition, a person of ordinary skill in the art would understand that the technology can be used for a variety of different types of mechanical systems, such as window controls, latches in glove compartments or other types of compartments, buttons of infotainment systems, toggles or buttons, or other types of mechanical systems. Nothing in this disclosure should be interpreted as limiting the scope of the technology only to the illustrated embodiments.

Figure 5:
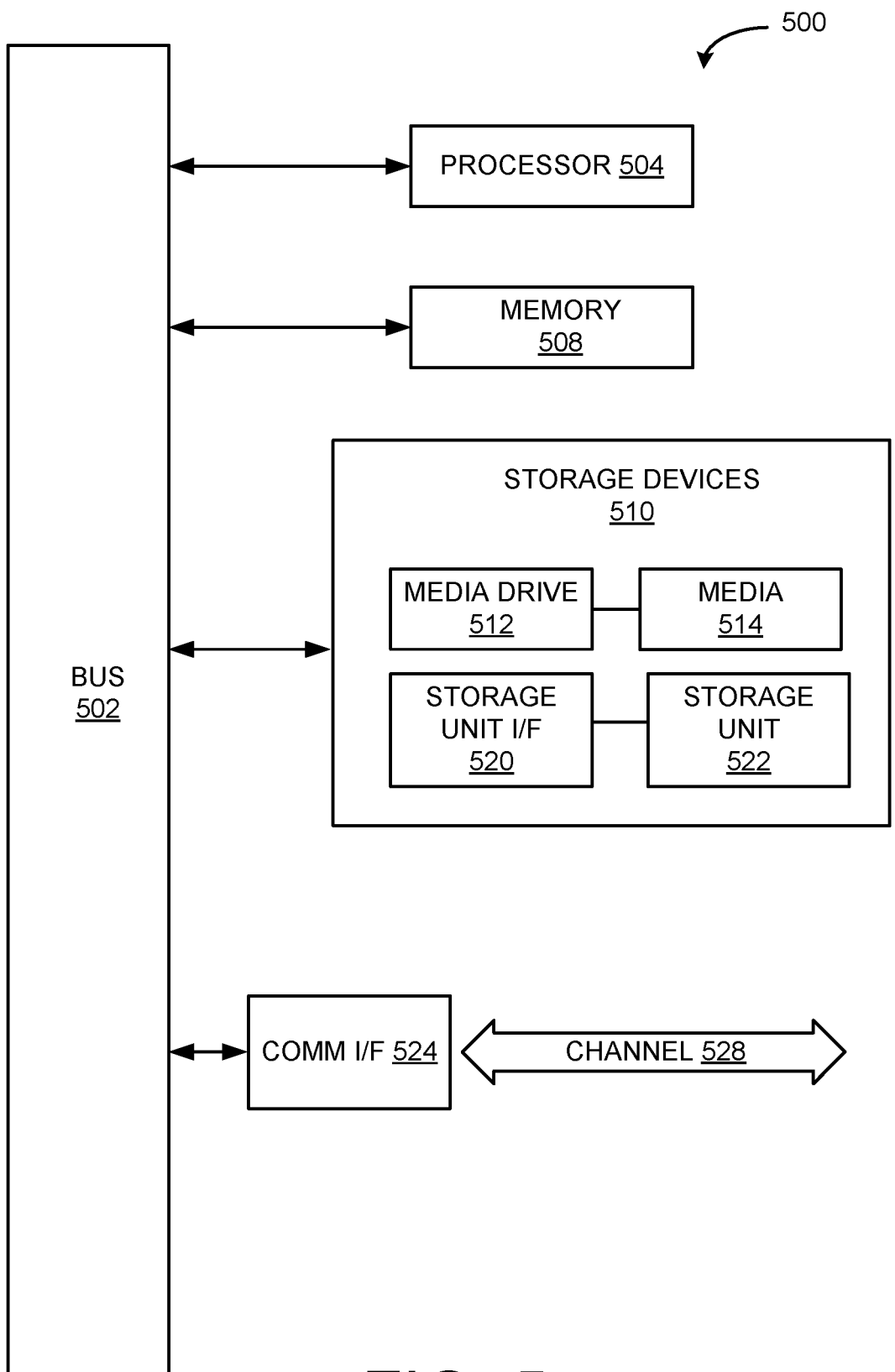
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   determining, by a processor, if a lever is necessary to operate a vehicle door, wherein the lever is disposed in a cavity of the vehicle door; and
   in response to determining the lever is necessary, manipulating, by the processor, a soft robotics material enclosing the lever and the cavity into an in-use state, the in-use state presenting the lever in a usable state, wherein the soft robotics material encloses the lever in a rest state and the in-use state;
   wherein the soft robotics material provides a smooth surface aligned with a surface of a door panel of the vehicle door when in the rest state and manipulating the soft robotics material comprises applying one or more stimuli to the soft robotics material.

2. The method of claim 1, further comprising determining, by the processor, if the door handle lever is used while the soft robotics material is in the in-use state.

3. The method of claim 2, further comprising in response to determining the lever was used while the soft robotics material is in the in-use state, returning, by the processor, the soft robotics material to the rest state.

4. The method of claim 3, wherein returning the soft robotics material to the rest state comprises removing the one or more stimuli.

5. The method of claim 1, wherein the one or more stimuli comprises one or more of heat, light, current, or pressure.

6. The method of claim 1, wherein determining if the lever is necessary comprises detecting an expected signal emitted from a token, a fob, an electronic key, or a portable device.

7. The method of claim 1, wherein manipulating the soft robotics material by the processor comprises controlling one or more actuators configured to apply the one or more stimuli.

8. A soft robotics vehicle door handle system comprising:
   a cavity disposed in a handle area of a vehicle door;
   a lever disposed in the cavity;
   a soft robotics material enclosing the lever and the cavity, the soft robotics material being aligned with a surface of a door panel of the vehicle door when the soft robotics material is in a rest state;
   one or more sensors;

one or more actuators configured to apply one or more stimuli to the soft robotics material; and an actuator control circuit communicatively coupled to the one or more actuators and the one or more sensors, wherein, in response to the actuator control circuit determining the lever is necessary to operate the vehicle door, the actuator control circuit controls application of one or more stimuli to the soft robotics material to manipulate the soft robotics material into an in-use state, the one or more stimuli applied using the one or more actuators, wherein the soft robotics material encloses the lever in the rest state and the in-use state.

9. The system of claim 8, the one or more sensors comprising one or more proximity sensors, one or more cameras, one or more beacon detectors, or a combination thereof.

10. The system of claim 8, the one or more actuators comprising one or more compressors, one or more voltage sources, one or more current sources, one or more thermal devices, one or more lights, or a combination thereof.

11. The system of claim 8, wherein one or more lights are disposed within the soft robotics material.

12. The system of claim 8, wherein the soft robotics material is configured with one or more detail features providing tactile feedback to a person, the one or more detail features comprising one or more of ridges, grooves, finger grips, or a combination thereof.

13. The system of claim 8, wherein the actuator control circuit is located within the vehicle door.

14. The system of claim 8, wherein the actuator control circuit is part of an electronic control unit (ECU) of a vehicle.

15. The system of claim 8, wherein the soft robotics material comprises a fluidic elastomer.

16. A soft robotics vehicle door handle system comprising:

a cavity disposed in a handle area of a vehicle door;

a soft robotics material comprising a lever, the lever disposed within the cavity, wherein:

the soft robotics material encloses the cavity and the lever, and aligned with a surface of the vehicle door when the soft robotics material is in a rest state;

one or more sensors;

one or more actuators configured to apply one or more stimuli to the soft robotics material; and an actuator control circuit communicatively coupled to the one or more actuators and the one or more sensors;

wherein:

in response to the actuator control circuit determining the lever is necessary to operate the vehicle door, the actuator control circuit controls application of one or more stimuli to the soft robotics material to manipulate the soft robotics material into an in-use state, the one or more stimuli applied using the one or more actuators; and manipulating the soft robotics material into the in-use state comprises deforming the soft robotics material so that the lever is presented in a usable state, wherein the soft robotics material encloses the lever in the rest state and the in-use state.

* * * * *